(12) United States Patent
Yamamoto et al.

(10) Patent No.: US 12,345,549 B2
(45) Date of Patent: Jul. 1, 2025

(54) COMPOSITE MOLDED COMPONENT

(71) Applicant: Sumitomo Wiring Systems, Ltd., Yokkaichi (JP)

(72) Inventors: Hironobu Yamamoto, Yokkaichi (JP); Kyungwoo Kim, Yokkaichi (JP); Toshinari Kobayashi, Yokkaichi (JP); Yukitoshi Terasaka, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 372 days.

(21) Appl. No.: 18/040,765

(22) PCT Filed: Jul. 30, 2021

(86) PCT No.: PCT/JP2021/028279
§ 371 (c)(1),
(2) Date: Feb. 6, 2023

(87) PCT Pub. No.: WO2022/030377
PCT Pub. Date: Feb. 10, 2022

(65) Prior Publication Data
US 2023/0280192 A1    Sep. 7, 2023

(30) Foreign Application Priority Data

Aug. 7, 2020   (JP) ................. 2020-134789

(51) Int. Cl.
*G01D 11/24*   (2006.01)
*G01D 11/16*   (2006.01)

(52) U.S. Cl.
CPC .......... *G01D 11/245* (2013.01); *G01D 11/16* (2013.01)

(58) Field of Classification Search
CPC ............................ G01D 11/245; G01D 11/16
See application file for complete search history.

(56) References Cited

FOREIGN PATENT DOCUMENTS

| JP | H5-166977 A | | 7/1993 |
|----|----|----|----|
| JP | 2001297671 A | * | 10/2001 |
| JP | 2003-177171 A | | 6/2003 |

OTHER PUBLICATIONS

International Search Report, Application No. PCT/JP2021/028279, mailed Oct. 19, 2021. ISA/Japan Patent Office.

* cited by examiner

*Primary Examiner* — Jamel E Williams
(74) *Attorney, Agent, or Firm* — Honigman LLP

(57) ABSTRACT

The object of the present disclosure is to minimize a number of positioning pins used to position an inner molded portion when an outer molded portion is molded around the inner molded portion. The present disclosure provides a composite molded component including an inner molded portion and an outer molded portion that covers the inner molded portion. An anti-rotation detent hole, which is open at a surface of the inner molded portion, is formed in the inner molded portion, a through hole that extends from a surface of the outer molded portion to the anti-rotation detent hole is formed in the outer molded portion, the anti-rotation detent hole is a hole that is delimited by an inner peripheral surface and a bottom surface, and at least part of the inner peripheral surface is formed in a non-circular shape.

9 Claims, 5 Drawing Sheets

COMPOSITE MOLDED COMPONENT

CROSS-REFERENCE TO RELATED APPLICATIONS

This application is the U.S. national stage of PCT/JP2021/028279 filed on Jul. 30, 2021, which claims priority of Japanese Patent Application No. JP 2020-134789 filed on Aug. 7, 2020, the contents of which are incorporated herein.

TECHNICAL FIELD

The present disclosure relates to a composite molded component.

BACKGROUND

JP 2003-177171 discloses a technology where an electronic component and circuitry are arranged in an insulating holder, the electronic component and circuitry are covered with elastic resin, the holder is supported with support pins to position the holder inside a mold used for injection molding, and these parts are integrally molded together in resin to form a case.

In JP 2003-177171, a plurality of support pins are used to position the holder inside the mold. However, since marks left when the support pins are removed will appear at the boundary between the holder and the outer case, there is the risk of the boundary part becoming an infiltration route for water. Accordingly, there is demand to minimize the number of locations where positioning is performed with support pins.

It is an object of the present disclosure to minimize the number of positioning pins used to position an inner molded portion when an outer molded portion is molded around the inner molded portion.

SUMMARY

A composite molded component according to an aspect of the present disclosure includes: an inner molded portion; and an outer molded portion that covers the inner molded portion, wherein an anti-rotation detent hole, which is open at a surface of the inner molded portion, is formed in the inner molded portion, a through hole that extends from a surface of the outer molded portion to the anti-rotation detent hole is formed in the outer molded portion, the anti-rotation detent hole is a hole that is delimited by an inner peripheral surface and a bottom surface, and at least part of the inner peripheral surface is formed in a non-circular shape.

Advantageous Effects

According to the present disclosure, it is possible to minimize the number of positioning pins for positioning an inner molded portion when molding an outer molded portion around the inner molded portion.

DETAILED DESCRIPTION OF PREFERRED EMBODIMENTS

Figure 1:
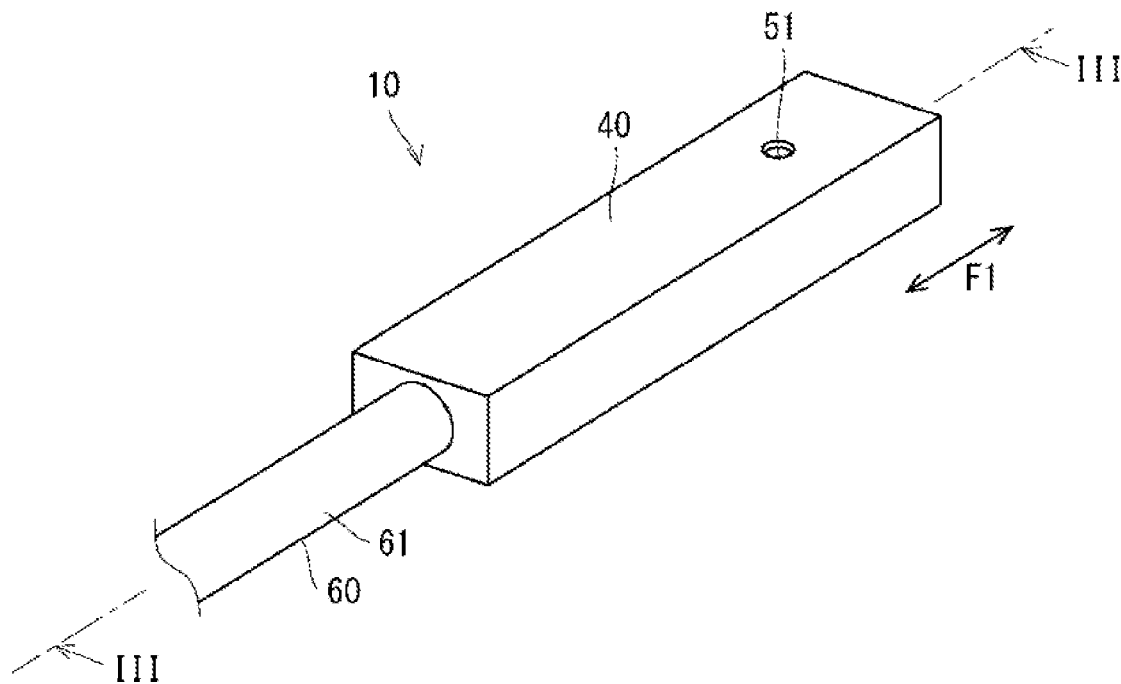
FIG. 1 is a perspective view depicting a composite molded component according to an embodiment.

Several embodiments of the present disclosure will first be listed and described in outline.

One aspect of a composite molded component according to the present disclosure is as follows.

First Aspect

A composite molded component according to a first aspect includes: an inner molded portion; and an outer molded portion that covers the inner molded portion, wherein an anti-rotation detent hole, which is open at a surface of the inner molded portion, is formed in the inner molded portion, a through hole that extends from a surface of the outer molded portion to the anti-rotation detent hole is formed in the outer molded portion, the anti-rotation detent hole is a hole that is delimited by an inner peripheral surface and a bottom surface, and at least part of the inner peripheral surface is formed in a non-circular shape.

According to the first aspect of the composite molded component, since at least part of an inner peripheral surface of the anti-rotation detent hole is non-circular, by fitting a positioning pin into this non-circular inner peripheral surface, it is possible to stop rotation of the inner molded portion. By doing so, when molding the outer molded portion around the inner molded portion, it is possible to minimize the number of positioning pins for positioning the inner molded portion.

Second Aspect

In a second aspect, the composite molded component according to the first aspect, at least part of the inner peripheral surface of the through hole may be formed in a non-circular shape so as to gradually widen from one side to another along a first direction and, at an intermediate position, start gradually narrowing toward the other side. In this case, the through hole is a part that is left as a mark produced by a positioning pin when the outer molded portion is molded. This means that at least part of an outer peripheral surface of the positioning pin is also shaped so as to gradually widen from one side to another along a first direction and, at an intermediate position, start gradually narrowing toward the other side. Due to molten resin flowing from the one side toward the other side when molding the outer molded portion, the molten resin can flow smoothly around the positioning pin.

Third Aspect

In a third aspect, the composite molded component according to the second aspect, an inner peripheral surface of at least part of the through hole may be formed in a shape where a maximum dimension in the first direction is larger than a maximum dimension in a second direction that is perpendicular to the first direction. In this case, the through hole is a part that is left as a mark produced by a positioning pin when the outer molded portion is molded. This means that at least part of an outer peripheral surface of the positioning pin is also shaped so that a maximum dimension in the first direction is larger than a maximum dimension in a second direction that is perpendicular to the first direction. In this case, when molding the outer molded portion, it is possible to reduce the projecting region of the positioning pin in a direction along the flow of the molten resin, which enables the molten resin to flow smoothly.

Fourth Aspect

In a fourth aspect, the composite molded component according to the second or third aspect, the outer molded portion may be formed in a shape that is elongated in one direction, and the first direction may be a direction along a length direction of the outer molded portion. When the outer molded portion is an elongated shape that is long in one direction, it is assumed that the molten resin for forming the outer molded portion flows along the length direction of the outer molded portion. This means that it is possible for molten resin that flows along the first direction along the length direction of the outer molded portion to smoothly flow around the positioning pin.

Fifth Aspect

In a fifth aspect, the composite molded component according to any one of the first to the fourth aspects, a same inner peripheral surface shape may be continuous on both sides of a boundary between the anti-rotation detent hole and the through hole. In this case, since the same inner peripheral shape is continuous on both sides of the boundary between the anti-rotation detent hole and the through hole, it is possible to simplify the shape of the positioning pin.

Sixth Aspect

In a sixth aspect, the composite molded component according to any one of the first to the fifth aspects, a first hole that extends from a surface of the outer molded portion to inside the inner molded portion may be formed, a second hole that extends from a surface of the outer molded portion to inside the inner molded portion may be formed on an opposite side to the first hole, and at least one of an innermost part of the first hole and an innermost part of the second hole may be the anti-rotation detent hole. A first positioning pin may be inserted into a hole corresponding to the first hole out of the inner molded portion. A second positioning pin may be inserted into a hole corresponding to the second hole on the opposite side to the first hole out of the inner molded portion. As a result, it is possible to perform positioning in a direction in which the first hole and the second hole extend and also in a direction perpendicular to this direction. Since at least one of an innermost part of the first hole and an innermost part of the second hole is the anti-rotation detent hole, it is possible to use at least one of the innermost part of the first hole and the innermost part of the second hole for positioning in a state where rotation of the inner molded portion is stopped. This means that it is possible to position the inner molded portion using a low number of positioning pins.

Seventh Aspect

In a seventh aspect, the composite molded component according to the sixth aspect, a deeper innermost part out of an innermost part of the first hole formed in the inner molded portion and an innermost part of the second hole formed in the inner molded portion may be the anti-rotation detent hole. In this case, it is possible to reliably stop rotation of the inner molded portion more reliably using a deep anti-rotation detent hole.

Eighth Aspect

In an eighth aspect, composite molded component according to any one of the first to the seventh aspects may further include an electric component which has been covered by the inner molded portion. In this case, it is possible to waterproof the electric component covered by the inner molded portion more reliably.

Ninth Aspect

In a ninth aspect, the composite molded component according to any one of the first to the eighth aspects, at least part of the inner peripheral surface may be rhombic, elliptical, or droplet shaped. By doing so, it is possible to stop rotation of the inner molded portion.

Specific examples of composite molded components according to the present disclosure are described below with reference to the drawings. It should be noted that the present disclosure is not limited to the examples described here, but defined in the claims, and is intended to include all modifications within the meaning and scope equivalent thereof.

Embodiments

Figure 2:
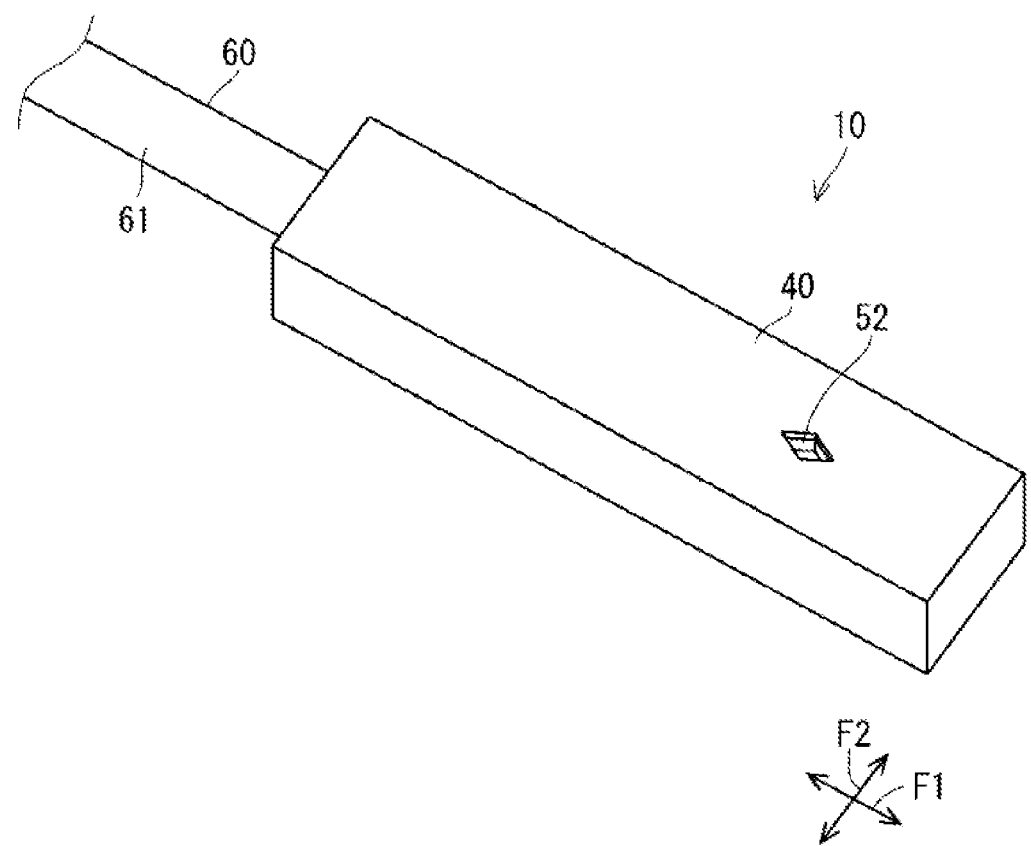
FIG. 2 is a perspective view depicting the composite molded component according to the embodiment.
Figure 3:
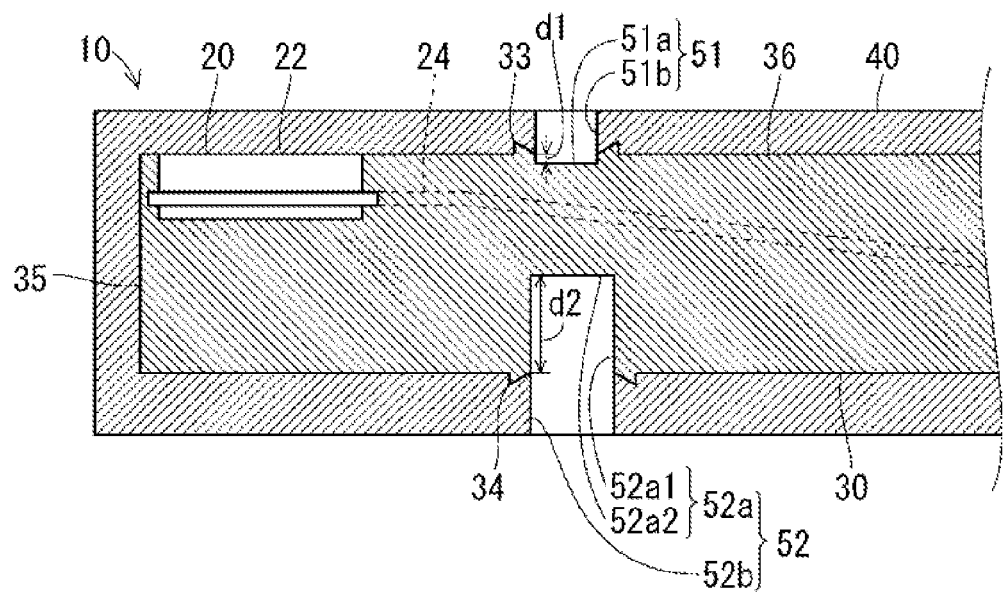
FIG. 3 is a cross-sectional view along a line III-III in FIG. 1.
Figure 4:
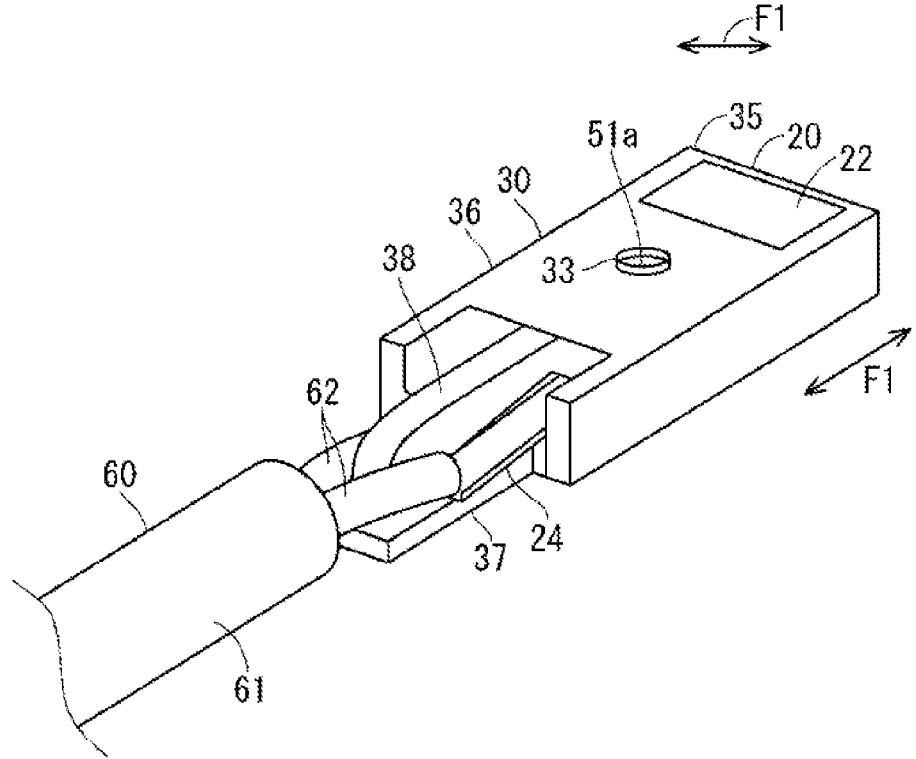
FIG. 4 is a perspective view depicting an inner molded portion of the composite molded component.
Figure 5:
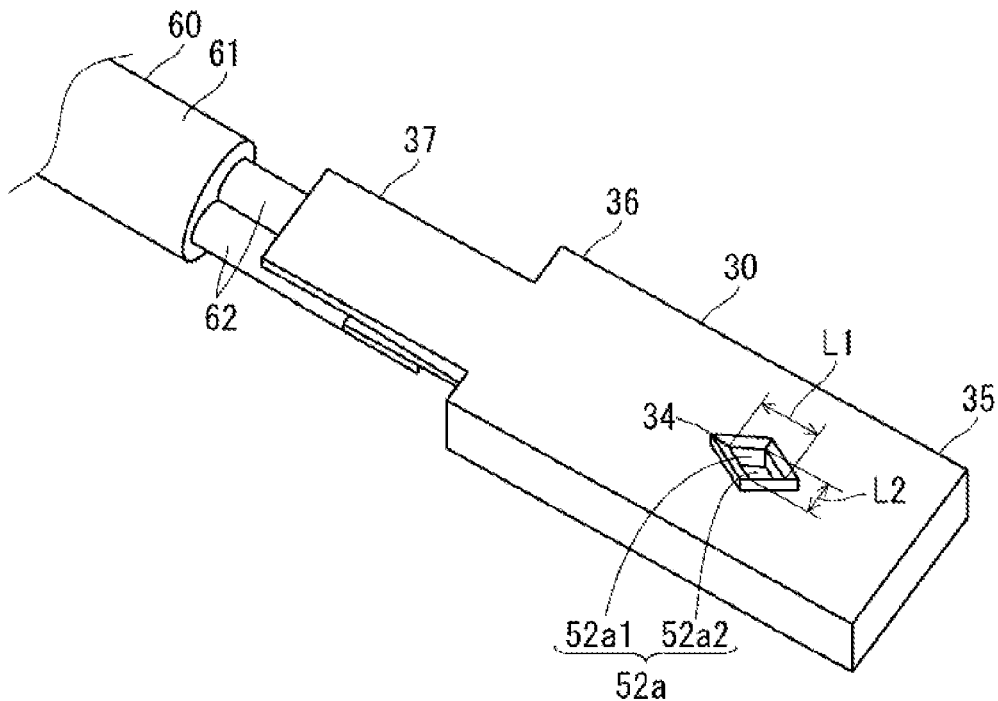
FIG. 5 is a perspective view depicting the inner molded portion of the composite molded component.

A composite molded component according to an embodiment will now be described. FIG. 1 and FIG. 2 are perspective views depicting a composite molded component 10. FIG. 3 is a cross-sectional view taken along a line III-III in FIG. 1. FIG. 4 and FIG. 5 are perspective views depicting an inner molded portion 30 of the composite molded component. FIG. 1 and FIG. 4 are perspective views from the same direction. FIG. 2 and FIG. 5 are perspective views from the same direction.

The composite molded component 10 includes the inner molded portion 30 and an outer molded portion 40. The outer molded portion 40 is a component that covers the inner molded portion 30. By having the inner molded portion 30 covered with the outer molded portion 40, improved waterproofing of an inside of the inner molded portion 30 is achieved.

In the present embodiment, the information processing apparatus 10 is equipped with an electric component 20 that is covered by the inner molded portion 30. The inner molded portion 30 is a resin part that covers the electric component 20 and the outer molded portion 40 is a resin part that covers the electric component 20 and the inner molded portion 30. By covering the electric component 20 with the inner molded portion 30 and further covering this with the outer molded portion 40, waterproofing of the electric component 20 is improved. As one example, the inner molded portion 30 is molded in a state where the electric component 20 has been positioned using positioning pins. After this, it is possible to mold the outer molded portion 40 in a state where the inner molded portion 30 has been positioned using positioning pins. By doing so, it is possible to cover the entire outside of the electric component 20 with the inner molded portion 30 and the outer molded portion 40 and thereby improve waterproofing while also improving the positioning accuracy of the inner molded portion 30 and the positioning accuracy of the electric component 20 inside the outer molded portion 40.

When the outer molded portion 40 is molded, the inner molded portion 30 is positioned using positioning pins. When the positioning pins are pulled out after molding of the outer molded portion 40, holes, which are pin marks, are left that extend from the surface of the outer molded portion 40 to the inner molded portion 30. If a boundary between the inner molded portion 30 and the outer molded portion 40 is exposed inside a hole formed as a pin mark, the boundary may act an infiltration route for water. This makes it necessary to minimize the number of holes (pin marks). The present disclosure relates to a technique for positioning the inner molded portion 30 with a minimal number of positioning pins when molding the outer molded portion 40.

The various components will now be described in detail.

As one example, the electric component 20 is a sensor element 20. The sensor element 20 is an element that detects a physical quantity, such as magnetism, light, or temperature, and/or changes in such quantity. Here, a case where the sensor element 20 is assumed to be a magnetic sensor will be described. Magnetic fields are hardly affected by resin, which is a non-magnetic material. This means that when the sensor element 20 is a magnetic sensor, the entire sensor element 20 may be covered by the inner molded portion 30 and the outer molded portion 40.

The sensor element 20 is equipped with an element main body portion 22 and lead portions 24. As one example, the element main body portion 22 is formed in a flat rectangular parallelepiped shape. The element main body portion 22 outputs a signal in keeping with the peripheral environment, as examples, the size, orientation, and the like of a peripheral magnetic field. The lead portions 24 extend from the element main body portion 22. In this example, two lead portions 24 extend from the element main body portion 22 in parallel. In this example, the lead portions 24 are formed of metal or the like in the shape of narrow plates. A detection output of the element main body portion 22 is output to the outside via the two lead portions 24.

The output of the sensor element 20 is transmitted via a cable 60. The cable 60 includes a plurality of (in this example, two) electric wires 62 and an outer covering 61. The electric wires 62 are covered electric wires and each have a covering formed around a core wire. The outer covering 61 covers the two electric wires 62. The outer covering 61 is stripped at end portions of the cable 60 to expose the two electric wires 62. The two electric wires 62 also have the covering stripped at end portions to expose the core wires. The end portions of the two electric wires 62 are disposed on and along the two lead portions 24, and the respective core wires are electrically and mechanically connected to the lead portions 24. In this example, the core wires are soldered to the lead portions 24. The core wires and the lead portions 24 may be electrically and mechanically connected by welding, crimping, or the like.

It is not essential for the electric wires to be connected to the sensor element 20 to be gathered into a single element using an outer covering or the like. The electric wires connected to the sensor element may extend away from the sensor element individually. The number of electric wires connected to the sensor element may be increased or decreased depending on factors such as the number of lead portions of the sensor element. It is not essential for electric wires to be connected to the sensor element, and another FPC (flexible printed circuit) or the like may be connected to a sensor.

The inner molded portion 30 is a part formed using resin. As examples, the inner molded portion 30 may be formed of polyamide resin, PE (polyethylene), or PBT (polybutylene terephthalate).

In more detail, the inner molded portion 30 is a part produced by molding resin with the sensor element 20 as an insert component. The inner molded portion 30 is provided with an element housing portion 35 and a lead portion housing portion 36.

The element housing portion 35 is formed in a rectangular parallelepiped shape. The element main body portion 22 of the sensor element 20 is housed at a position close to a first main surface of a first end portion of the element housing portion 35. In this configuration, a first main surface of the element main body portion 22 is exposed at the first main surface of the first end portion of the element housing portion 35. The lead portions 24 that extend away from the element main body portion 22 pass inside the element housing portion 35 and extend toward a second end of the element housing portion 35.

The lead portion housing portion 36 is provided so as to connect to the second end portion of the element housing portion 35. The lead portion housing portion 36 includes a bottom plate portion 37 and a partition portion 38. The bottom plate portion 37 is formed as a plate that extends from the second end portion of the element housing portion 35. The two lead portions 24 extend onto and are exposed on the bottom plate portion 37. The partition portion 38 is provided at a center portion in a width direction of the bottom plate portion 37 as a partition between the two lead portions 24.

When the inner molded portion 30 is molded with the sensor element 20 as an insert component, the respective exposed parts described above of the sensor element 20 are placed in contact with a mold surface and/or positioning parts of the mold. By doing so, the inner molded portion 30 is molded in a state where the sensor element 20 has been positioned inside the mold. This means that the sensor element 20 is precisely held at a fixed position with respect to the inner molded portion 30.

Note that the core wires described above may be soldered to the lead portions 24 in a state where the sensor element 20 has been inserted into the inner molded portion 30. However, the core wires may be soldered to the lead portions 24 before the sensor element 20 is inserted into the inner molded portion 30. It is not essential for the inner molded portion 30 to be molded with the sensor element 20 as an insert component. It is also possible to mold the inner molded portion 30 into a shape into which the sensor element 20 can be fitted and to then fit the sensor element 20 into the inner molded portion 30. That is, it is sufficient for the inner molded portion 30 to be a component that holds the electric component 20.

The outer molded portion 40 is a part formed using resin. As examples, the outer molded portion 40 may be formed of polyamide resin, PE (polyethylene), or PBT (polybutylene terephthalate) in the same way as the inner molded portion 30. It is not essential for the outer molded portion 40 and the inner molded portion 30 to be formed of the same resin. If the outer molded portion 40 and the inner molded portion 30 are formed of the same resin, favorable adhesion is achieved between the two.

The outer molded portion 40 covers the inner molded portion 30. The outer molded portion 40 may cover the entire periphery of the inner molded portion 30, or may cover part of the outer molded portion 40. In this example, the outer molded portion 40 covers the entire inner molded portion 30 except for parts of the inner molded portion 30 used for positioning. That is, the entire outside of the sensor element 20 is covered by at least one of the inner molded portion 30 and the outer molded portion 40. Here, the outer form of the outer molded portion 40 is formed in a narrow rectangular parallelepiped shape. The element main body portion 22 is embedded in a part that is close to the first end portion of the outer molded portion 40. A front end portion of the outer covering 61 of the cable 60 is embedded in a part close to the second end portion of the outer molded portion 40. The part of the cable 60 that is covered by the outer covering 61 extends outward from the second end portion of the outer molded portion 40. Note that it is not essential for the outer form of the outer molded portion 40 to be a rectangular parallelepiped.

A first hole 51 is formed so as to extend from an outer surface of the outer molded portion 40 to an inside of the inner molded portion 30. A second hole 52 is formed on an opposite side to the first hole 51 so as to extend from an outer surface of the outer molded portion 40 to an inside of the inner molded portion 30. That is, the opening of the first hole 51 and the opening of the second hole 52 face in opposite directions to each other. The second hole 52 may be located on a line extending from a center axis of the first hole 51. By doing so, it becomes possible to stably position the inner molded portion 30 by sandwiching the inner molded portion 30 between a positioning pin disposed in the first hole 51 and a positioning pin disposed in the second hole 52. In view of this, a line extending from the center axis of the first hole 51 and a line extending from the center axis of the second hole 52 may coincide. In the present embodiment, the first hole 51 is formed so as to extend inside a surface, out of the four side surfaces surrounding the inner molded portion 30, where the sensor element 20 is exposed. The second hole 52 is formed so as to extend deeply inside a surface, out of the four side surfaces surrounding the inner molded portion 30, on the opposite side to the surface where the sensor element 20 is exposed.

The formation positions of the first hole 51 and the second hole 52 are not limited to the examples described above. As one example, the first hole and the second hole may be formed to extend inside the inner molded portion 30 from outer surfaces, out of the outer surfaces of the outer molded portion 40, in the width direction of the sensor element 20 (that is, outer surfaces along the direction in which the two lead portions 24 are aligned).

Other holes may also be formed to extend inside the inner molded portion 30 from the outer surfaces of the outer molded portion 40. However, it is sufficient for the composite molded component 10 to have only the first hole 51 and the second hole 52 described above as holes that extend inside the inner molded portion 30 from outer surfaces of the outer molded portion 40.

At least one of an innermost part, which is formed inside the inner molded portion 30, of the first hole 51 and an innermost part, which is formed inside the inner molded portion 30, of the second hole 52 is an anti-rotation detent hole 52a. In the present embodiment, an example where the innermost part of the second hole 52 formed inside the inner molded portion 30 is an anti-rotation detent hole 52a is described. However, the innermost part of the first hole 51 formed inside the inner molded portion 30 and the innermost part of the second hole 52 formed inside the inner molded portion 30 may both be anti-rotation detent holes, or the innermost part of the first hole 51 formed inside the inner molded portion 30 may be an anti-rotation detent hole.

In more detail, the part of the second hole 52 formed in the outer molded portion 40 is a through hole 52b, and a part of the second hole 52 that is open at the surface of the inner molded portion 30 and is recessed into the inner molded portion 30 is the anti-rotation detent hole 52a.

The anti-rotation detent hole 52a is a bottomed hole delimited by an inner peripheral surface 52a1 and a bottom surface 52a2. At least part of the inner peripheral surface 52a1 in a direction along the central axis of the anti-rotation detent hole 52a is formed in a non-circular shape. In other words, a horizontal cross-section (that is, a cross section in a direction perpendicular to the center axis) at at least one part along the center axis of the anti-rotation detent hole 52a is formed in a non-circular shape. Here, the expression "non-circular" means any shape that is not a circle, or in other words, a shape where the distance between a boundary delimiting a region and a geometric center of the internal region delimited by the boundary is not constant and varies. Examples of non-circular shapes include an ellipse, a square, a rectangle, a rhombus, a star, a droplet shape, and a keyhole shape. The inner peripheral surface 52a1 of the anti-rotation detent hole 52a may be formed in a non-circular shape across the entire range in the direction of the center axis. Note that only part of the inner peripheral surface 52a1 of the anti-rotation detent hole 52a, as one example, the innermost part, may be formed in a non-circular shape.

In the present embodiment, the entire inner peripheral surface 52a1 of the anti-rotation detent hole 52a is formed as a non-circular inner peripheral surface. In more detail, the inner peripheral surface 52a1 of the anti-rotation detent hole 52a is formed in a rhombus shape where one diagonal is longer than the other diagonal. The longer diagonal of the rhombus shape extends along the length direction of the inner molded portion 30, and the shorter diagonal line extends along the width direction of the inner molded portion 30.

The through hole 52b extends from an outer surface of the outer molded portion 40 to the anti-rotation detent hole 52a. That is, from the viewpoint of the outer molded portion 40, the through hole 52b passes through from an outer surface of the outer molded portion 40 to an inner surface.

The through hole 52b may be formed as a non-circular hole, or may be formed as a circular hole. The inner peripheral surface of at least a part of the through hole 52b may be formed in a non-circular shape so as to gradually widen from one side to another along a first direction F1 and, at an intermediate position, start gradually narrowing toward the other side. In other words, the inner peripheral surface of at least a part of the through hole 52b may be formed in a shape that is widest at an intermediate portion along the first direction F1 and gradually narrows from this widest part along the first direction F1 toward both sides. Examples of applicable non-circular shapes include an ellipse, a rhombus (where one diagonal is disposed along the first direction F1), and a droplet shape (where a direction in which a curved front end and an acute rear end are joined is disposed along the first direction F1).

The first direction F1 mentioned above may coincide with the length direction of the outer molded portion 40. The length direction of the outer molded portion 40 may be the direction in which molten resin flows when the outer molded portion 40 is molded. If the inner peripheral surface shape of at least a part of the through-hole 52*b* is the shape described above with respect to the first direction F1 in which the molten resin flows, it will be possible for molten resin to avoid a positioning pin disposed at the part corresponding to the through hole 52*b* and smoothly flow toward the rear in the length direction.

At least part of the inner peripheral surface of the through hole 52*b* may be formed in a shape where a maximum dimension L1 in the first direction F1 is larger than a maximum dimension L2 in a second direction F2 that is perpendicular to the first direction F1. In other words, the width of at least the inner peripheral surface of the through hole 52*b* when viewed along the first direction F1 is small when compared to the width when viewed along the second direction F2 that is perpendicular to the first direction F1.

The first direction F1 here may be a direction that coincides with the length direction of the outer molded portion 40 as mentioned above. Also as described above, the length direction of the outer molded portion 40 may be the direction in which molten resin flows when the outer molded portion 40 is molded. If the shape of the inner peripheral surface of at least a part of the through-hole 52*b* with respect to the first direction F1 in which the molten resin flows is the shape described above, it is possible to reduce the projecting region of a positioning pin disposed at a part corresponding to the through-hole 52*b* in the direction in which the molten resin flows, which makes it possible for the molten resin to avoid the positioning pin and flow smoothly. Examples of shapes that are long in the first direction F1 include an ellipse (whose major axis is disposed along the first direction F1), a rhombus with different diagonal lengths (and whose longer diagonal is disposed along the first direction F1), a droplet shape (where the direction in which a curved front end and an acute-angled rear end are joined is disposed along the first direction F1), and a rectangle (where the direction of the long side is disposed along the first direction F1).

At least a part of the inner peripheral surface of the through hole 52*b* may be formed in a non-circular shape so as to gradually widen from one side to another along a first direction F1 and, at an intermediate position, start gradually narrowing toward the other side and may be formed so that the maximum dimension L1 in the first direction F1 is larger than the maximum dimension L2 in the second direction F2 that is perpendicular to the first direction F1. As examples, at least part of the inner peripheral surface of the through hole 52*b* is shaped as an ellipse (whose major axis is disposed along the first direction F1), a rhombus with different diagonal lengths (where the longer diagonal is arranged along the first direction F1), or a droplet shape (where the direction in which a curved front end and an acute-angled rear end are joined is disposed along the first direction F1).

The shape of the inner peripheral surface described above may be one part of the through hole 52*b* in the length direction, or may be the entire range in the length direction.

The anti-rotation detent hole 52*a* and the through hole 52*b* described above may have the same shape or may have different shapes. As one example, the anti-rotation detent hole 52*a* may be formed as a non-circular hole, and the through hole 52*b* may be formed in the shape of a circular cylinder. In the present embodiment, the same inner peripheral surface shape continues on both sides of the boundary between the anti-rotation detent hole 52*a* and the through hole 52*b* (that is, the boundary between the inner molded portion 30 and the outer molded portion 40). In this example, the anti-rotation detent hole 52*a* and the through hole 52*b* are formed so as to have the same inner peripheral shape. This means that a positioning pin that is disposed from the through hole 52*b* into the anti-rotation detent hole 52*a* can be formed in a cylindrical shape where the same outer peripheral surface shape is continuous.

A part of the first hole 51 formed in the outer molded portion 40 is a through hole 51*b*, and a part of the first hole 51 that is open at the surface of the inner molded portion 30 and is recessed into the inner molded portion 30 is a positioning hole 51*a*.

The positioning hole 51*a* is formed in the shape of a bottomed circular hole. The positioning hole 51*a* may be formed in a non-circular shape in the same way as the anti-rotation detent hole 52*a* described above. A depth d1 of the positioning hole 51*a* is smaller than a depth d2 of the anti-rotation detent hole 52*a* (see FIG. 3). That is, out of the innermost part (referred to as the "positioning hole 51*a*") of the first hole 51 formed in the inner molded portion 30 and the innermost part (referred to as the "anti-rotation detent hole 52*a*") of the second hole 52 formed in the inner molded portion 30, the deeper of the innermost parts is an anti-rotation detent hole. The present embodiment is an example where, for arrangements where one out of the two positioning holes is formed in a non-circular shape, the deeper hole is formed in a non-circular shape. By doing so, one of the two positioning pins will be non-circular, but the other positioning pin can be made circular, which is easy to process. In the anti-rotation detent hole 52*a* which is the deeper out of the holes, the contact area between the positioning pin and the anti-rotation detent hole 52*a* is increased, so that rotation can be securely prevented.

Note that the anti-rotation detent hole 52*a* and the positioning hole 51*a* are set to a depth that does not reach the electric component 20 inside the inner molded portion 30.

The through hole 51*b* extends from an outer surface of the outer molded portion 40 to the positioning hole 51*a*. That is, from the viewpoint of the outer molded portion 40, the through hole 51*b* passes through from an outer surface of the outer molded portion 40 toward an inner surface.

The through hole 51*b* may be formed as a circular hole, or may be formed as a non-circular hole in the same way as the through hole 52*b* described above. In the present configuration, the through hole 51*b* is formed as a circular hole. The through hole 51*b* may be formed as a circular hole so that the same shape as the inner peripheral surface of the positioning hole 51*a* is continuous.

In addition, in the present embodiment, the inner molded portion 30 includes annular rib portions 33 and 34 that protrude toward the outer molded portion 40. The annular rib portions 33 and 34 have a role of more reliably preventing water from infiltrating along the boundary between the inner molded portion 30 and the outer molded portion 40.

In this configuration, the annular rib portion 33 is formed at a part of the surface of the inner molded portion 30 that surrounds the positioning hole 51*a*. Likewise, the annular rib portion 34 is formed at a part of the surface of the inner molded portion 30 that surrounds the anti-rotation detent hole 52*a*. At least one of the positioning hole 51*a* and the anti-rotation detent hole 52*a* may be concentrically provided with a plurality of annular ribs.

In this example, the annular rib portions 33 and 34 are formed as circular protrusions. The annular rib portions may be formed as elliptical protrusions or as polygonal protrusions. It is preferable for the annular rib portions 33 and 34 to be formed so that their width narrows toward a front end in the protruding direction.

When the outer molded portion 40 is molded with the inner molded portion 30 as an insert, the resin that has melted due to heat will cause the annular rib portions 33 and 34, and in particular the front end portions of the annular rib portions 33 and 34, to also melt. As a result, these front end portions of the annular rib portions 33 and 34 out of the inner molded portion 30 and the outer molded portion 40 become fused together to form an integral body. This results in the boundary between the inner molded portion 30 and the outer molded portion 40 becoming more effectively waterproofed at the parts where the annular rib portions 33 and 34 are formed, that is, around the positioning hole 51a and the anti-rotation detent hole 52a.

In particular, when the front end portions of the annular rib portions 33 and 34 are narrow, the front end portions of the annular rib portions 33 and 34 will readily become fused into the outer molded portion 40. Accordingly, at the boundary between the inner molded portion 30 and the outer molded portion 40, more complete waterproofing is achieved along the annular rib portions 33 and 34. Such annular rib portions 33 and 34 are sometimes called "melt ribs". The inner molded portion 30 and the outer molded portion 40 are preferably made of the same material so that the annular rib portions 33 and 34 and the outer molded portion 40 can easily fuse together.

Figure 6:
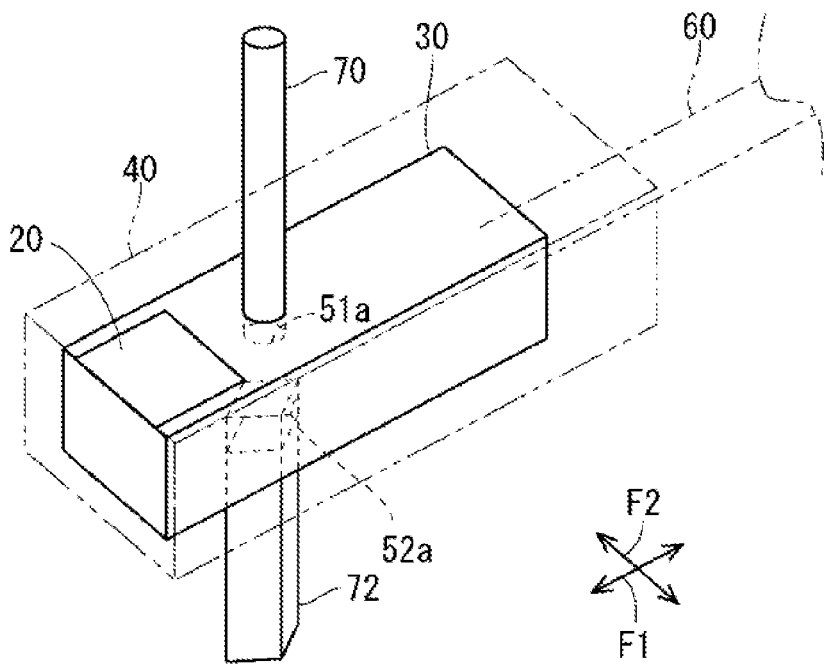
FIG. 6 is an explanatory view depicting a state where the inner molded portion has been positioned by positioning pins.
Figure 7:
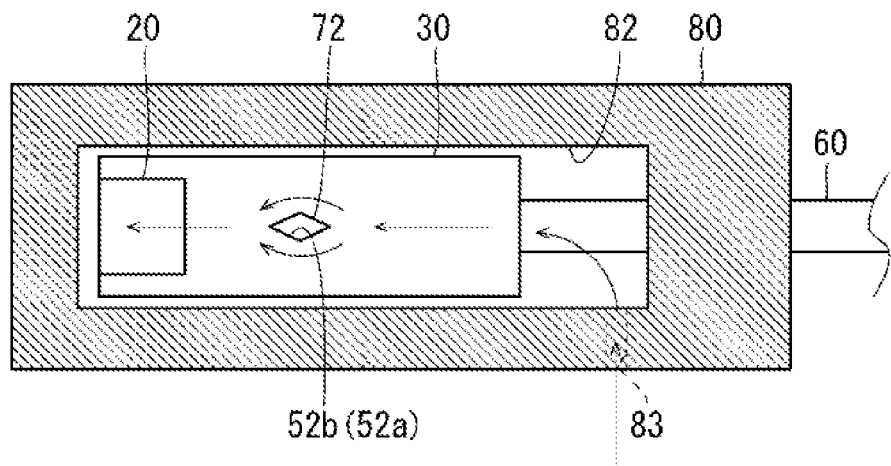
FIG. 7 is an explanatory view depicting a state of molten resin inside a mold that molds an outer molded portion.

FIG. 6 is an explanatory view depicting a state where the inner molded portion 30 has been positioned by positioning pins 70 and 72. In FIG. 6, the outer molded portion 40 is indicated by a chain double-dashed line. FIG. 7 is an explanatory view depicting the state of molten resin in a mold 80 for molding the outer molded portion 40. Note that in FIG. 6 onwards, the inner molded portion 30 is illustrated in a simplified manner.

When molding the outer molded portion 40 with the inner molded portion 30 as an insert, the inner molded portion 30 is positioned inside the mold 80 by the positioning pins 70 and 72. The positioning pin 70 is inserted into the positioning hole 51a. The positioning pin 70 is formed in a shape corresponding to the shape of the inner peripheral surface of the positioning hole 51a, which in this configuration is a round cylinder. The positioning pin 72 is formed in a shape corresponding to the shape of the inner peripheral surface of the anti-rotation detent hole 52a, here, in a cylindrical shape with a rhombic cross section where one diagonal is longer than the other diagonal.

The positioning pin 72 is provided so as to protrude from below into a mold space 82 inside the mold 80. The positioning pin 70 is provided so as to protrude from above into the mold space 82. It is preferable for the positioning pin 70 and the positioning pin 72 to face each other.

A front end portion of the positioning pin 72 is fitted into the anti-rotation detent hole 52a. A front end portion of the positioning pin 70 is fitted into the positioning hole 51a. By doing so, the inner molded portion 30 becomes sandwiched between the front end portions of the positioning pins 70 and 72, which positions the inner molded portion 30 at a fixed position in the vertical direction. Since the front end portions of the positioning pins 70 and 72 are fitted into the positioning hole 51a and the anti-rotation detent hole 52a, the inner molded portion 30 is also positioned at a fixed position in a direction perpendicular to the direction in which the positioning pins 70 and 72 extend. In addition, since the positioning pin 72, which is shaped as a non-circular cylinder, is fitted into the anti-rotation detent hole 52a, which is a hole of a corresponding non-circular shape, rotation of the inner molded portion 30 about the axes of the positioning pins 70 and 72 is restricted.

In this state, molten resin for forming the outer molded portion 40 is injected into the mold space 82. The mold space 82 is a space that is elongated in the direction in which the outer molded portion 40 extends. An injection port 83 for injecting the molten resin into the mold space 82 is provided at a position near the first end in the direction in which the mold space 82 extends. The molten resin injected through the injection port 83 flows toward the other end in the direction in which the mold space 82 extends.

The positioning pins 70 and 72 described above are present outside the inner molded portion 30 and inside the mold space 82. This means that when the molten resin flows inside the mold space 82, the resin passes around the positioning pins 70 and 72 described above.

When the molten resin reaches the positioning pin 72, since the positioning pin 72 is formed in a shape that gradually widens from one side toward the other along the first direction F1, the molten resin flows smoothly so as to split on both sides of the positioning pin 72. The positioning pin 72 gradually narrows from an intermediate position, which is situated between one end and the other end along the first direction F1, toward the other end. This results in the molten resin smoothly flowing behind the positioning pin 72. Since the molten resin can smoothly flow around the positioning pin 72, the molten resin smoothly fills the inside of the mold space 82, especially around the positioning pin 72. As a result, the annular rib portion 34 is likely to favorably melt and fuse into the outer molded portion 40, which means that the annular rib portion 34 is likely to effectively improve the waterproofing.

In addition, since the projecting region of the positioning pin 72 in the mold space 82 is small in the first direction F1 in which the molten resin flows, the resistance to flow caused by the positioning pin 72 can be reduced when the molten resin flows through the mold space 82.

After the molten resin has cooled and solidified, the inner molded portion 30 and the outer molded portion 40 are removed from the mold 80 to manufacture the composite molded component 10. In the composite molded component 10, a mark due to the positioning pin 70 is formed as the first hole 51 and a mark due to the positioning pin 72 is formed as the second hole 52.

According to the composite molded component 10 configured as described above, since at least a part of the inner peripheral surface of the anti-rotation detent hole 52a has a non-circular shape, by fitting the positioning pin 72 into the non-circular inner peripheral surface, rotation of the inner molded portion 30 can be stopped. By doing so, the number of positioning pins for positioning the inner molded portion 30 can be minimized when molding the outer molded portion 40 around the inner molded portion 30. If the number of positioning pins can be reduced, the number of locations where the boundary between the inner molded portion 30 and the outer molded portion 40 is exposed to the external space can be reduced. As a result, it is possible to reduce the number of locations where water infiltrates between the inner molded portion 30 and the outer molded portion 40, and to improve the waterproofing of the inside of the inner molded portion 30.

The through hole 52b is a part that remains as a mark produced by the positioning pin 72. If the through-hole 52b, that is, the positioning pin 72, has a shape that gradually widens from one side toward the other side along the first direction F1 and, at an intermediate position, starts gradually narrowing toward the other side, it will be possible for the molten resin to smoothly flow around the positioning pin 72 and wrap around the rear of the positioning pin 72. By doing so, the mold space 82 for forming the outer molded portion 40 becomes smoothly filled with the molten resin. In addition, the annular rib portion 34 around the anti-rotation detent hole 52a can smoothly melt and become fused into the outer molded portion 40, which also improves waterproofing.

If the through hole 52b, that is, the positioning pin 72, is shaped so that the maximum dimension L1 in the first direction F1 is larger than the maximum dimension L2 in the second direction F2, the projecting region of the positioning pin 72 when the molten resin flows will be smaller. This also enables the molten resin to smoothly flow around the positioning pin 72.

When the outer molded portion 40 has a shape that is elongated in one direction, it is assumed that the molten resin for forming the outer molded portion 40 will flow along this length direction. This means that if the first direction F1 is along the length direction of the outer molded portion 40, the molten resin will be able to smoothly flow around the positioning pin 72.

If the same inner peripheral surface shape is continuous at the boundary between the anti-rotation detent hole 52a and the through hole 52b, it is possible for the same outer peripheral surface shape to be continuous for the corresponding part of the positioning pin 72. As a result, the shape of the positioning pin 72 can be simplified, the manufacturing cost can be reduced, and demolding becomes easier.

The first hole 51 that extends from the surface of the outer molded portion 40 into the inner molded portion 30 is formed, and the second hole 52 that extends from the surface of the outer molded portion 40 into the inner molded portion 30 is formed on the opposite side. As a result, the inner molded portion 30 is positioned in the axial direction of the positioning pins 70 and 72 inserted into the first hole 51 and the second hole 52 and also in a direction perpendicular to this axial direction. At least one of the innermost part of the first hole 51 and the innermost part of the second hole 52 is formed as an anti-rotation detent hole 52a, so that rotation of the inner molded portion 30 can be stopped with a small number of positioning pins 70 and 72.

Other positioning pins may be provided depending on the size, complexity of shape, and the like of the composite molded component 10.

Also, if the innermost part of the second hole 52 on the lower side is the anti-rotation detent hole 52a, the front end portion of the positioning pin 72 can be inserted into the anti-rotation detent hole 52a by placing the inner molded portion 30 on the positioning pin 72. As a result, it is possible to set the inner molded part 30 in a predetermined posture at an initial stage of setting the inner molded part 30 in the mold 80.

When the inner molded portion 30 covers the electric component 20, this has the merit of effectively waterproofing the electric component 20.

Modifications of the anti-rotation detent hole 52a and the through hole 52b, and also the positioning pin 72 disposed at a part corresponding to these holes will now be described.

Figure 8:
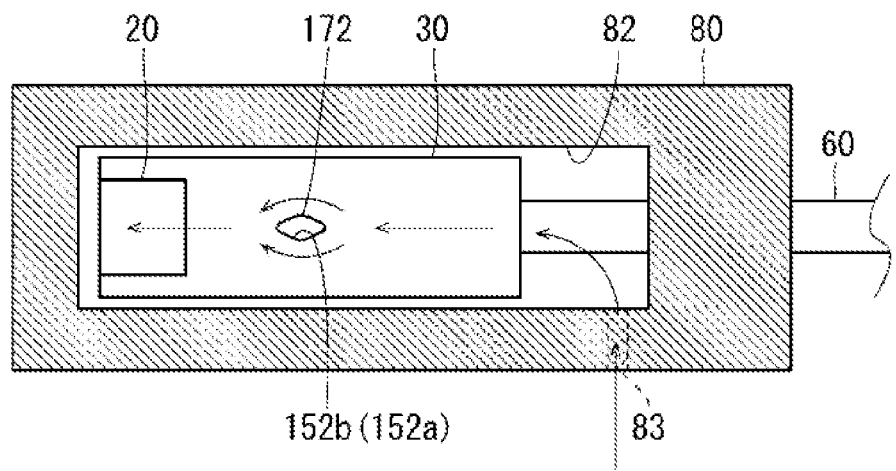
FIG. 8 is an explanatory view depicting an anti-rotation detent hole, a through hole, and a positioning pin according to a modification.

As depicted in FIG. 8, an anti-rotation detent hole 152a, a through hole 152b, and a positioning pin 172 corresponding to the anti-rotation detent hole 52a, the through hole 52b, and the positioning pin 72 may have rhombic shapes with rounded corners. That is, the expression "rhombus" includes not only a rhombus with sharp corners but also a rhombus with rounded corners.

Figure 9:
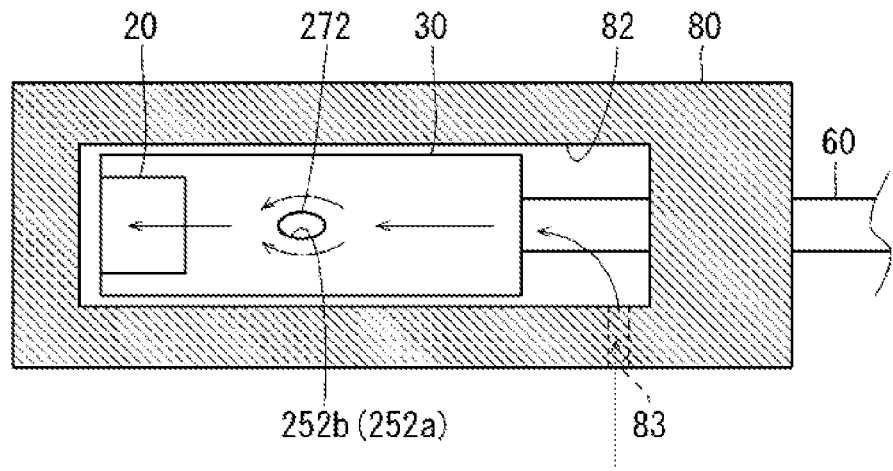
FIG. 9 is an explanatory view depicting an anti-rotation detent hole, a through hole, and a positioning pin according to another modification.
Figure 9:
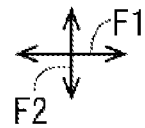

As depicted in FIG. 9, an anti-rotation detent hole 252a, a through hole 252b, and a positioning pin 272 corresponding to the anti-rotation detent hole 52a, the through hole 52b and the positioning pin 72 may be elliptical. In this case, the direction of the major axis is preferably provided along the first direction F1 described above.

Figure 10:
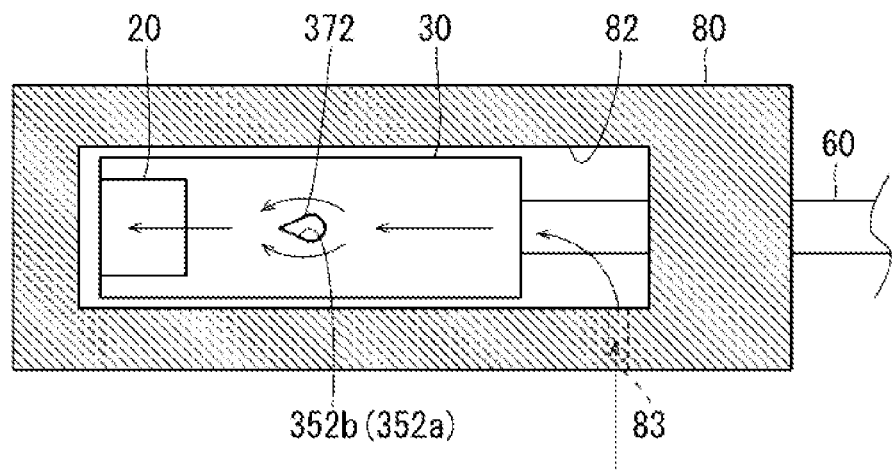
FIG. 10 is an explanatory view depicting an anti-rotation detent hole, a through hole, and a positioning pin according to yet another modification.
Figure 10:
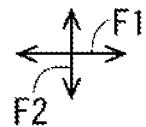

Also, as depicted in FIG. 10, an anti-rotation detent hole 352a, a through hole 352b, and a positioning pin 372 corresponding to the anti-rotation detent hole 52a, the through hole 52b, and the positioning pin 72 may be droplet shaped. A droplet shape is a shape formed when a liquid drips down, and is a shape that has a semicircular arc on one side and a sharp angle on the other side. In this droplet shape, the dimension in a direction from the center of the semicircular arc to the other corner may be longer than the dimension in the direction perpendicular to this direction. The length direction of the droplet shape may be along the first direction F1.

In these modifications also, it is possible to stop rotation of the inner molded portion 30 with the positioning pins 172, 272, and 372. Molten resin can also smoothly flow around the positioning pins 172, 272, and 372.

Note that the configurations described in the above embodiment and modifications can be combined as appropriate so long as they do not contradict each other. As one example, both the first hole and the second hole 52 at the top and bottom may be non-circular anti-rotation detent holes, and may be formed as respectively different non-circular anti-rotation detent holes such as those described in the embodiment and modifications above.

The invention claimed is:

1. A composite molded component comprising:
   an inner molded portion; and
   an outer molded portion that covers the inner molded portion,
   wherein an anti-rotation detent hole, which is open at a surface of the inner molded portion, is formed in the inner molded portion,
   a through hole that extends from a surface of the outer molded portion to the anti-rotation detent hole is formed in the outer molded portion,
   the anti-rotation detent hole is a hole that is delimited by an inner peripheral surface and a bottom surface, and
   at least part of the inner peripheral surface is formed in a non-circular shape.

2. The composite molded component according to claim 1, wherein at least part of the inner peripheral surface of the through hole is formed in a non-circular shape so as to gradually widen from one side to another along a first direction and, at an intermediate position, start gradually narrowing toward the other side.

3. The composite molded component according to claim 2, wherein an inner peripheral surface of at least part of the through hole is formed in a shape where a maximum dimension in the first direction is larger than a maximum dimension in a second direction that is perpendicular to the first direction.

4. The composite molded component according to claim 2, wherein the outer molded portion is formed in a shape that is elongated in one direction, and
   the first direction is a direction along a length direction of the outer molded portion.

5. The composite molded component according to claim 1, wherein a same inner peripheral surface shape is continuous on both sides of a boundary between the anti-rotation detent hole and the through hole.

6. The composite molded component according to claim 1,
- wherein a first hole that extends from a surface of the outer molded portion to inside the inner molded portion is formed,
- a second hole that extends from a surface of the outer molded portion to inside the inner molded portion is formed on an opposite side to the first hole, and
- at least one of an innermost part of the first hole and an innermost part of the second hole is the anti-rotation detent hole.

7. The composite molded component according to claim 6, wherein a deeper innermost part out of an innermost part of the first hole formed in the inner molded portion and an innermost part of the second hole formed in the inner molded portion is the anti-rotation detent hole.

8. The composite molded component according to claim 1, further comprising an electric component which has been covered by the inner molded portion.

9. The composite molded component according to claim 1, wherein at least part of the inner peripheral surface is rhombic, elliptical, or droplet shaped.

* * * * *